United States Patent
Kwon et al.

(10) Patent No.: US 7,523,451 B2
(45) Date of Patent: Apr. 21, 2009

(54) METHOD FOR PROCESSING UPDATED APPLICATION DATA IN HEADEND OR TERMINAL OF DIGITAL DATA BROADCASTING SYSTEM

(75) Inventors: Eun-Jung Kwon, Daejon (KR); O-Hyung Kwon, Daejon (KR); Soo-In Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 563 days.

(21) Appl. No.: 10/827,848

(22) Filed: Apr. 19, 2004

(65) Prior Publication Data

US 2005/0108701 A1    May 19, 2005

(30) Foreign Application Priority Data

Nov. 14, 2003    (KR) .................... 10-2003-0080618

(51) Int. Cl.
*G06F 9/44* (2006.01)
*H04N 7/173* (2006.01)

(52) U.S. Cl. ........................ 717/173; 725/92
(58) Field of Classification Search ......... 717/168–175; 725/131–132, 138–139, 143–144, 140, 151–152, 725/32, 92, 105, 118, 148
See application file for complete search history.

(56) References Cited

U.S. PATENT DOCUMENTS 5,805,155 A * 9/1998 Allibhoy et al. .............. 725/132
6,240,451 B1 * 5/2001 Campbell et al. ........... 709/224
6,970,960 B1 * 11/2005 Sarfati ......................... 717/141

FOREIGN PATENT DOCUMENTS

| JP | 2001-245272 | 9/2001 |
|---|---|---|
| KR | 2003-0021241 | 3/2003 |

* cited by examiner

Primary Examiner—Tuan Anh Vu
(74) Attorney, Agent, or Firm—Blakely, Sokoloff, Taylor & Zafman

(57) ABSTRACT

Provided is a method for processing updated data of an application in a headend or a subscriber's terminal of a digital data broadcasting system. The method of the present research forms updated object modules and non-updated object modules among the objects of the application data, transmits them to a subscriber's terminal, abstracts the updated objects in the subscriber's terminal among the objects transmitted from the headend, and outputs them onto a screen, when the objects of the application data are updated in the headend. The updated data processing method includes the steps of: a) confirming that the application data are updated upon an application content update request of a subscriber terminal or application file update of a contents provider; b) generating signaling information of the updated application data and transmitting the signaling information; c) separating updated objects from non-updated objects among objects constituting the application, and updating a file system structure and contents of the application; and d) forming modules including the updated objects and modules including the non-updated objects, updating version information of the modules including the updated objects.

2 Claims, 6 Drawing Sheets

-DSI (DownloadServiceinitiate)
-DII (DownloadinfoIndication)
-DDB (DownloadDataBlock)

METHOD FOR PROCESSING UPDATED APPLICATION DATA IN HEADEND OR TERMINAL OF DIGITAL DATA BROADCASTING SYSTEM

FIELD OF THE INVENTION

The present invention relates to a method for processing updated application data in a headend or a subscriber terminal of a digital data broadcasting system; and, more particularly, to an updated application data processing method that, when objects of an application are updated in a headend, can form updated object modules and non-updated object modules among the objects of the application and transmit the objects to the subscriber terminal. Then, the subscriber terminal abstracts and executes only the updated objects among the objects transmitted from the headend, and displays the updated objects on a screen.

DESCRIPTION OF RELATED ART

Digital data broadcasting is a service that transmits texts, pictures, graphic data, voice data, video data, program packages and other multimedia data to terminals, such as set-top boxes, computers, and mobile phones at an ultra-high transmission/reception rate. The service provides television (TV) program and related information, life information, access to the Internet, e-commerce, and interactive entertainments by using communication media, e.g., cable, terrestrial wave and satellite wave.

The digital data broadcasting service includes a one-way service provided upon the request of a subscriber, such as TV program, stock and whether information, and an interactive service in which a subscriber can participate in quiz show, purchasing goods, and the like through a terminal.

When using the interactive service, the subscriber accesses to a web server and participates in the purchase of goods or the quiz show by executing an application program (to be referred to as application, hereafter) installed in a terminal. Digital data contents are transmitted to the subscriber's terminal according to the application execution of the subscriber. For example, when the subscriber selects 'show detailed information of a product' during the purchasing process, detailed information of the product is abstracted from the web server and provided to the subscriber.

In a digital data broadcasting service, applications includes two types: Bound applications in connection with broadcasting services provided by a broadcasting service provider and unbound applications that are not related to the broadcasting services, such as an e-mail and a chatting program.

FIG. 1 is a block diagram showing a digital data broadcasting system including a typical headend and a subscriber terminal. As shown in FIG. 1, the digital data broadcasting system includes a headend 100, a host 200, a conditional access system 300 and a display 400.

The headend 100 encodes video, audio and other data provided by contents providers, manages the information of the subscribers registered for the digital data broadcasting service, restricts types of services according to the type of registered subscribers, forms information, such as TV program and related information thereof, daily life information, Internet access, e-commerce and interactive entertainment, into broadcasting signals, and transmits the broadcasting signals into the subscriber's terminal.

The host 200 decodes the broadcasting signals, which are transmitted from the headend 100 through an in-band channel, and additional information and/or control signals for controlling the broadcasting signals, which are transmitted through an out-of-band channel, by using a pre-established middle ware on the subscriber's part.

The conditional access system 300, which may be embodied by using a smart card or a cable card, analyzes the control signals for the broadcasting signals, additional information, and restrictive data which are received from the host 200 through the out-of-band channel.

The display 400 outputs the broadcasting signals, the additional information that are decoded in the host 200, and a screen showing the execution of the application.

The headend 100 includes an application server 110 for encoding data in accordance with a protocol for management of application and contents and a protocol for application signaling and transmission. The application server 110 analyzes data transmitted from the host 200 by the subscriber for the broadcasting service through the out-of-band channel and transmits updated contents to the host 200 in real-time.

The digital data broadcasting service conforms to Open Cable Application Platform Specification (OCAP) Protocol. It encodes the application and contents and transmits them to the host 200 by utilizing an Object Carousel and Data Carousel technique which is defined in the OCAP Protocol. That is, the application server 110 encodes the file system structure and the contents of the application and contents, and transmits them to the host 200 periodically.

According to the conventional technology described above, a data transmission rate is determined based on the data encoding and processing methods of the application server 100, and the data decoding rate, a data outputting rate and a resource utility rate of the host 200 are determined based on the data encoding and transmitting rates of the application server 110.

In short, whenever the application and contents are updated upon the request of the host 200, the application server 110 should form all of the objects of the application and contents, encode the objects, and transmit the encoded objects to the host 200. Thus, there are problems that the reception of the desired application and contents in the host 200 is delayed and it takes much time to analyze all the objects of the updated application and contents. In addition, resources are used wastefully.

To overcome the above problems, Korean Patent Laid-Open No. 2003-21241 entitled "Apparatus and method for recording interactive applications" discloses a method for removing repeatedly transmitted data in a host by discriminating data and recording data to be recorded in a recording medium by checking if another data carousel is referred to for a received object module.

However, the technology of Korean Patent Laid-Open No. 2003-21241 defines an independent descriptor that is not defined in the OCAP Protocol for digital data broadcasting service. Since it describes and encodes the application and contents by using the independent descriptor, the host needs an additional descriptor analyzing device to read the data described in the independent descriptor.

In short, since updated application data and contents are described using an individual method not defined in a protocol for digital data broadcasting and transmitted, the subscriber's terminal requires an additional application program and/or additional device for analyzing the updated data and contents. Also, it takes much time to analyze the updated data.

Since resources are limited, the time for executing application programs for various services is delayed and it takes longer time to perform other operations.

SUMMARY OF THE INVENTION

It is, therefore, an object of the present invention to provide a method for processing updated application data in a headend or a subscriber's terminal of a digital data broadcasting system, the method that can form updated object modules and non-updated object modules among the objects of the application data, transmit them to a subscriber's terminal, abstract the updated objects in the subscriber's terminal among the objects transmitted from the headend, and outputs them onto a screen, when the objects of the application data are updated in the headend.

In accordance with an aspect of the present invention, there is provided a method for processing updated data of an application in a headend of a digital data broadcasting system, including the steps of: a) confirming that the application data are updated upon an application content update request of a subscriber terminal or application file update of a contents provider; b) generating signaling information of the updated application data and transmitting the signaling information; c) separating updated objects from non-updated objects among objects constituting the application, and updating a file system structure and contents of the application; and d) forming modules including the updated objects and modules including the non-updated objects, updating version information of the modules including the updated objects.

In accordance with another aspect of the present invention, there is provided a method for processing updated data of an application in a subscriber terminal of a digital data broadcasting system, including the steps of: a) receiving signaling information of the updated data of the application transmitted from a headend; b) receiving data obtained by forming modules including updated objects and modules including non-updated objects and receiving control information for the data, both modules being transmitted from the headend; c) decoding the received data and the control information for the data; d) confirming that module version information of the data is updated from the decoded control information; e) abstracting objects of the modules whose version information are updated; f) updating the file system structure and contents of the application by storing the abstracted objects; and g) executing and outputting the updated objects that are stored and objects already stored.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
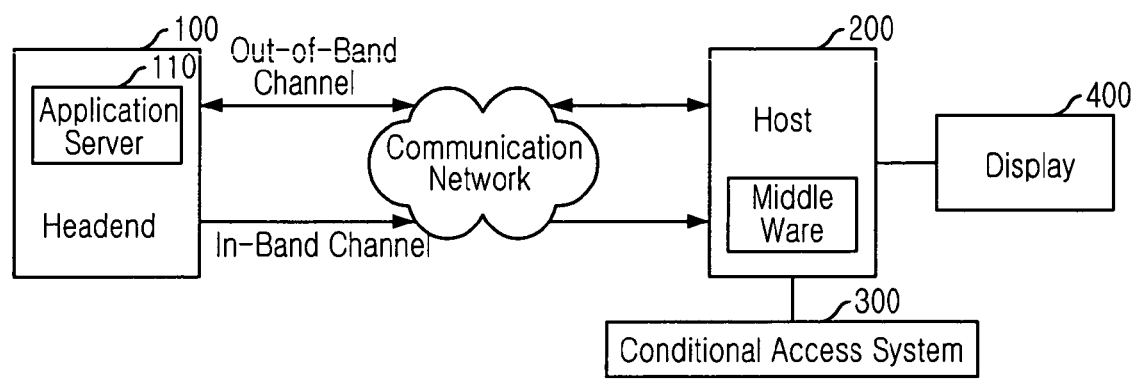
FIG. 1 is a block diagram showing a digital data broadcasting system including a typical headend and a subscriber terminal.
Figure 2:
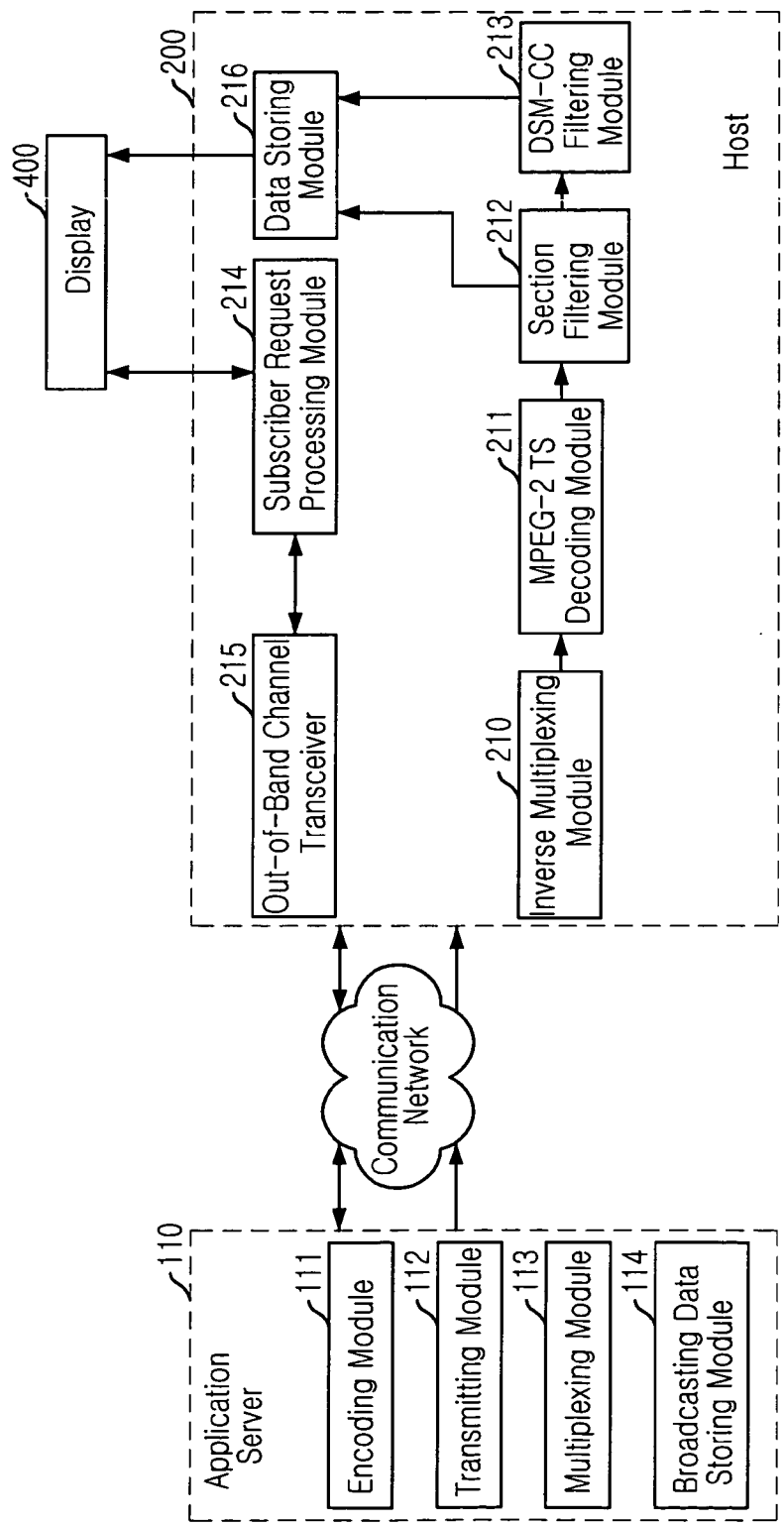
FIG. 2 is a block diagram describing an application server and a host to which the present invention is applied.

FIG. 2 is a block diagram describing an application server and a host to which the present invention is applied. As shown, the application server 110 of the present invention includes an encoding module 111, a multiplexing module 112, a transmitting module 113, and a broadcasting data storing module 114.

The encoding module 111 encodes an application and contents stored in a broadcasting data storing module 114, i.e., a broadcasting file system (BFS), into Moving Picture Experts Group (MPEG)-2 transport stream (TS) packets in conformity with an object carousel and data carousel protocol. The multiplexing module 112 multiplexes the encoded application and contents encoded in the encoding module 111 into video/audio/data.

The transmitting module 113 transmits the multiplexed MPEG-2 TS packets to the host 200 through an in-band channel. The broadcasting data storing module 114 stores the multiplexed MPEG-2 TS packets.

The host 200 of the present invention includes an inverse multiplexing module 210, an MPEG-2 TS decoding module 211, a section filtering module 212, a digital storage media command and control (DSM-CC) filtering module 213, a subscriber request processing module 214, an out-of-band channel transceiver 215 and a data storing module 216.

The inverse multiplexing module 210 inverse-multiplexes the application and contents, which are transmitted in the type of the MPEG-2 TS packets from the application server 110. The MPEG-2 TS decoding module 211 decodes the inverse-multiplexed MPEG-2 TS packets.

The section filtering module 212 filters the decoded application and contents, separates them into an MPEG-2 private section and a DSM-CC private section, analyses each section by referring to a table_id value for each section, stores analyzed data for the MPEG-2 private section in the data storing module 216 and transmits data for the DSM-CC private section to the DSM-CC filtering module 213.

The DSM-CC filtering module 213 analyzes the DSM-CC private section transmitted from the section filtering module 212 by using the data carousel and object carousel protocol, and stores the analyzed application and contents in the data storing module 216.

The subscriber request process module 14 converts the data inputted from the subscriber through an input unit of the display 400, such as an application update request, a request for information related to broadcasting program, into data format that can be analyzed in the application server 110, and transmits the converted data to the application server 110 through the out-of-band channel.

The out-of-band channel transceiver 215 transmits the converted data to the application server 110 through the out-of-band channel and receives control signals and additional information from the application server 110. The data storing module 216 stores the analyzed data for the MPEG-2 private section and the DSM-CC private section.

The application server 110 forms the application and contents into a plurality of objects, i.e., a file system structure and files, by using an object carousel technique. Then, it includes the objects in modules by using a data carousel technique and transmits them to the host 200 periodically.

The application server 110 separates non-updated objects from updated objects that are changed upon the request of a subscriber. After the separation, it forms modules including the updated objects, which will be referred to as updated object modules hereafter, raises the version of the updated object modules, forms modules including the non-updated objects, which will be referred to as non-updated object modules hereafter, and keeps the versions of the non-updated object modules.

Subsequently, the application server 110 transmits the updated object modules and the non-updated object modules to the host 200 based on the data carousel technique.

The host 200 analyzes the modules with updated version among the data transmitted from the application server 110 periodically, abstracts the objects of the module, stores the objects in the data storing module 216, and executes the objects. Since only the updated objects are selected and processed in the host 200, the delay time for executing the digital data broadcasting service can be shortened. Also, since system resources which are limited in quantity can be distributed properly, an operating rate can be improved.

The objects that are analyzed in the section filtering module 212 and the DSM-CC filtering module 213 and stored in the data storing module 216 are executed, i.e., restored, through middle ware in the host 200 and displayed on the display 400. The objects, i.e., the application and contents, stored in the data storing module 216 are given their execution priority order based on object signaling information transmitted from the application server 110 and then executed in the priority order.

The application and contents should go through application signal process in the host 200. Signaling of bound application is performed in the in-band channel based on an Application Information Table (AIT) having a form of an MPEG-2 private section. The priority order information of the bound application is added to an inner loop of the AIT defined in an application descriptor.

Meanwhile, signaling of unbound application is defined in an Extended Application Information Table (XAIT) file through a short virtual channel table (SVCT) of a service information (SI) or an XAIT descriptor of an outer loop of a long virtual channel table (LVCT). In short, the unbound application are processed in the host 200 based on the priority values defined by each application in the XAIT file in a descending order.

If an application transmitted from the application server 100 has a non-updated application identification, which includes an application_id and an organization_id, and a non-updated priority value and it is an unbound application, the application is stored in the data storing module 216 in an ascending order of launch order values and then executed.

Figure 3:
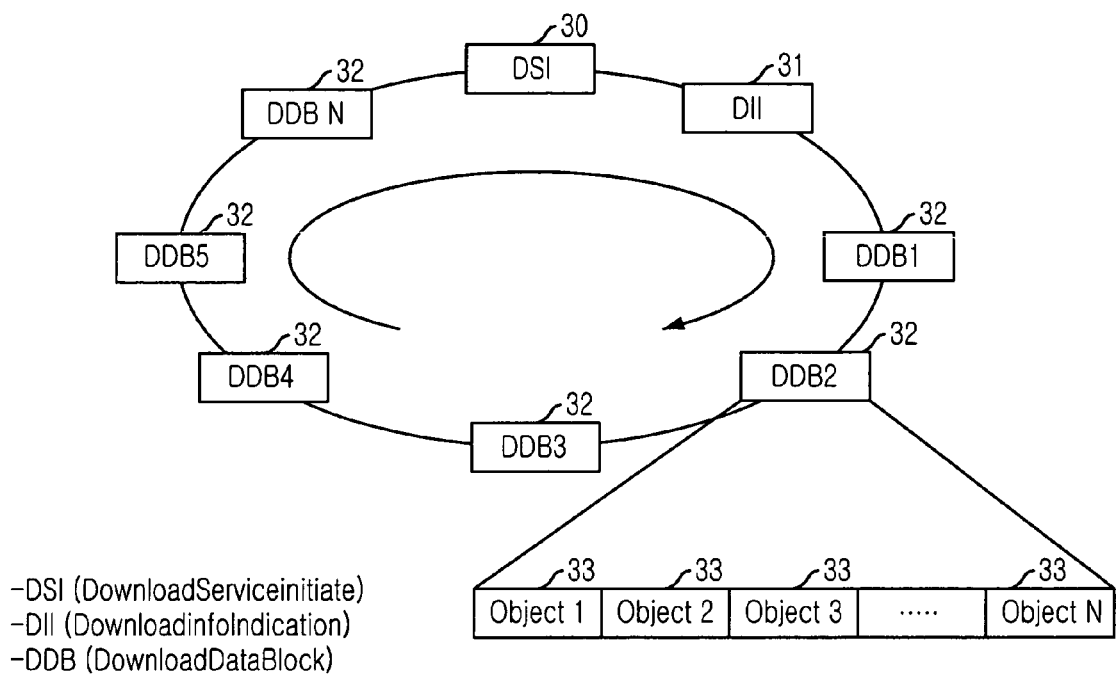
FIG. 3 is a diagram depicting an application transmitting process using data carousel in accordance with an embodiment of the present invention.

FIG. 3 is a diagram depicting an application transmitting process using data carousel in accordance with an embodiment of the present invention. The application server 110 forms the file system structures and files of the application and contents provided by a contents provider, such as broadcasting station, into a plurality of objects 33 by using the object carousel technique.

Then, the application server 110 forms modules of a download data block (DDB) 32 with the objects 33 and transmits the modules in the form of an MPEG-2 TS packet data to the host 200 periodically along with download control messages, such as download service initiate (DownloadServiceInitiate: DSI) 30 and download information indication (DownloadInformationIndication: DII) 31.

The download control messages 30 and 31 include various kinds of information so that the objects of the DDB 32 could be decoded properly in the host 200. For example, the DDI 31 includes technical information in connection with MPEG-2 TS and information on the number of transmitting modules, and the DSI 30 includes technical information on each DII when there are a plurality of transmitting DIIs.

As illustrated in FIG. 3, the application server 110 transmits DDB 32 and the download control messages DSI 30 and DII 31 of the DDB 32 to the host 200 during a predetermined period. Accordingly, the host 200 receives the application and contents transmitted through channel tuning.

The host 200 waits for reception of the download control messages, e.g., DSI 30 and DII 31, to analyze the received modules in the DDB 32, receives the download control messages, analyzes the modules in the DDB 32, and stores the file system structure and contents of the application and contents of the broadcasting data storing module 114.

In accordance with the present invention, when an application update is requested by the host 200 or the application is updated by the contents provider, the application server 110 figures out the contents of the updated application and updates the file system structures and contents of the updated application.

Subsequently, the application server 110 separates the objects of the updated application and the objects of the non-updated application, forms the updated object modules and the non-updated object modules, inserts the updated object modules and/or the non-updated object modules to the DDB 32, and transmits the DDB 32 to the host 200. Here, the DSI 30 and DII 31 including the control messages for the updated object modules and/or the non-updated object modules, such as updated module ID, are formed and transmitted to the host 200 along with the DDB 32.

Figure 4:
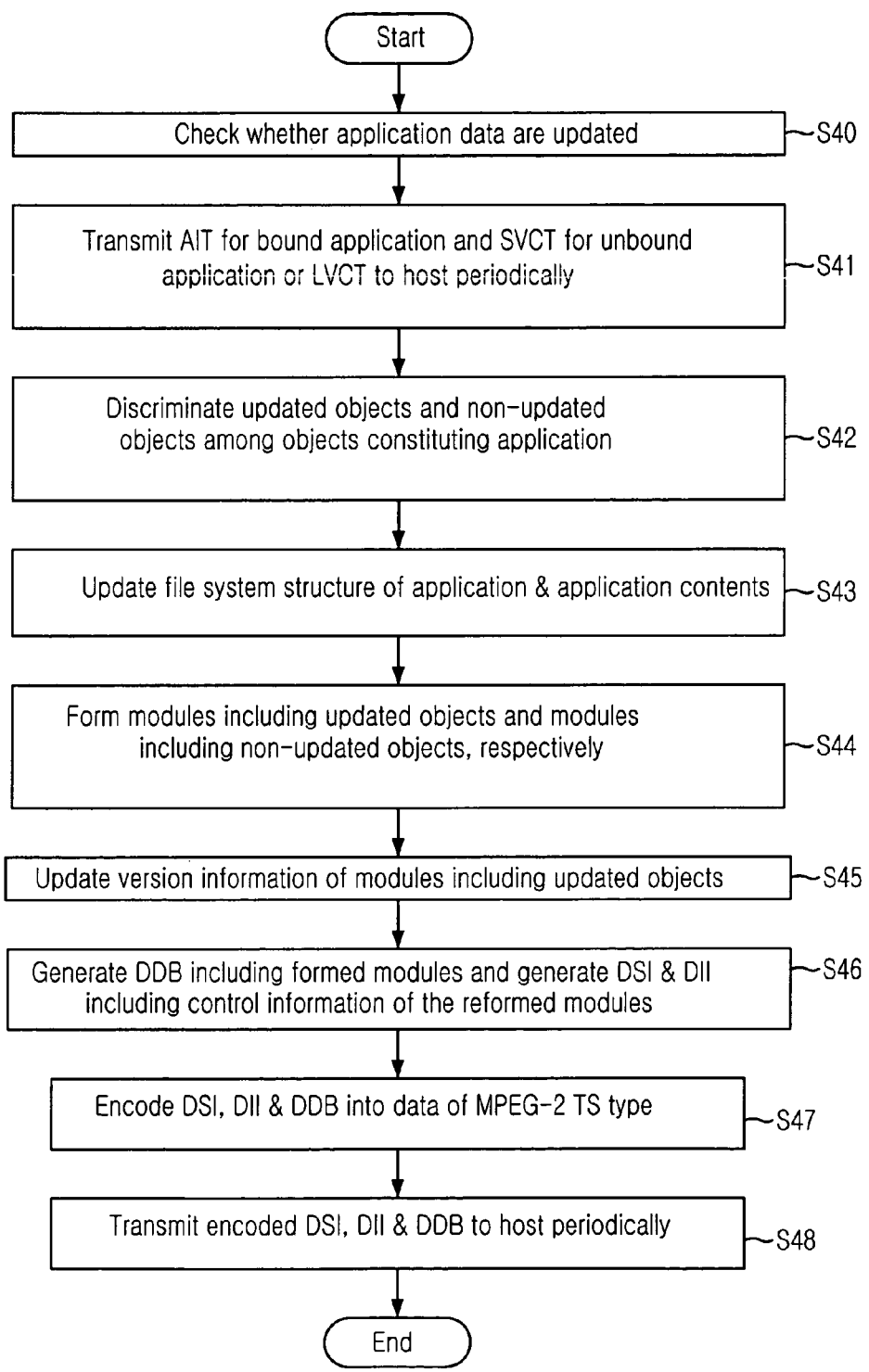
FIG. 4 is a flowchart describing an updated application data processing in a headend of a digital data broadcasting system in accordance with an embodiment of the present invention.

Hereafter, the updated application data processing will be described in detail with reference to FIG. 4. FIG. 4 is a flowchart describing an updated application data processing in a headend of the digital data broadcasting system in accordance with an embodiment of the present invention.

First, at step S40, it is checked whether the application data are updated. The application server 110 checks the update of the application data when an application content update is requested by the host 200 or a content provider updates the application files. Then, a process of updating the application file and contents is carried out.

At step S41, among the application, AIT for bound application and SVCT or LVCT for unbound application are transmitted to the host 200 periodically. When the data of the bound application are updated, the application server 110 updates the version, which is an AIT descriptor, of the AIT for signaling, and transmits the updated version information to the host 200.

The host 200 receiving the AIT from the application server 110 compares the newly received AIT with a previously received AIT. If the AIT descriptor is not updated, that is, both AITs are the same, the newly received AIT needs not be analyzed. If the AIT descriptor is updated, that is, the two AITs are different from each other, the newly received AIT is analyzed and the AIT of the bound application transmitted from the application server 110 is updated in the data storing module 216.

Also, since the data of the bound application are updated, the application server 110 updates the version information (XAIT descriptor) of SVCT or LVCT for signaling and transmits them to the host 200. The host 200 receiving the SVCT or LVCT from the application server 110 compares the newly received SVCT or LVCT with previously received SVCT or LVCT. Then, if the version information, which is an XAIT descriptor, is not updated, the host 200 determines whether the newly received SVCT or LVCT need not be analyzed. If the version information is updated, it analyzes the newly received SVCT or LVCT and updates the SVCT or LVCT of an unbound application transmitted from the application server 110 in the data storing module 216.

Since the data of a specific bound application among bound applications, the application server 110 and the host 200 should update signaling information (AIT) of all bound applications. On the other hand, since the data of a specific unbound application among unbound applications are updated, only the signaling information, SVCT or LVCT, of the unbound application having the updated data is updated.

Additionally, since the AIT, SVCT or LVCT which is needed to refer to the information related to the application transmitted from the application server 110 in the host 200, the AIT, SVCT or LVCT is transmitted to the host 200 before substantial application data are transmitted. For example, the application server 110 transmits the AIT, SVCT or LVCT to the host 200 periodically at an interval of around 10 seconds from a time before the application data are transmitted.

The signaling information, i.e., AIT, SVCT, LVCT, includes information such as the location of the application, related data, required resources, auto-starting function and related applications.

Subsequently, at step S42, among the objects that constitute the application, updated objects and non-updated objects are separated.

At step S43, the file system structures and contents of the application are updated. At step S44, the modules including updated objects, i.e., updated object modules, and the modules including non-updated objects, i.e., non-updated object modules are formed respectively.

At step S45, the version information of the updated object modules is updated. Then, at step S46, the DDB 32 including the formed modules and the DSI 30 and DII 31 including the control information of the DDB 32 are generated.

At step S47, the DSI 30, the DII 31 and the DDB 32 are encoded in the form of MPEG-2 TS data. At step S48, the encoded DSI 30, DII 31 and DDB 32 are transmitted to the host 200 periodically.

Figure 5:
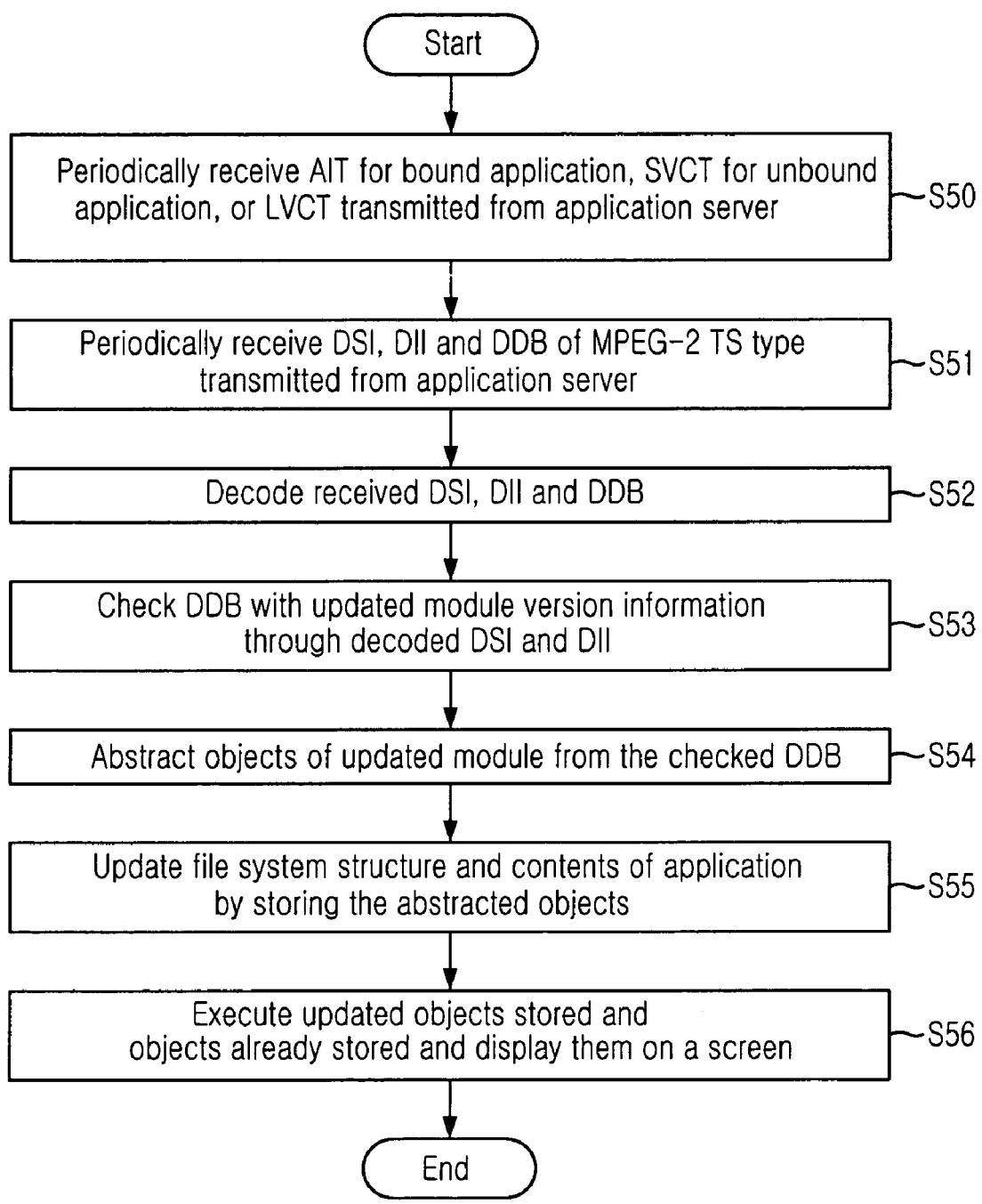
FIG. 5 is a flowchart showing an updated application data processing method in a subscriber terminal of a digital data broadcasting system in accordance with an embodiment of the present invention.

FIG. 5 is a flowchart showing an updated application data processing method in a subscriber terminal of the digital data broadcasting system in accordance with an embodiment of the present invention.

At step S50, the AIT for the bound application transmitted from the application server 110 and the SVCT or the LVCT for the unbound application are received periodically. At step S51, the DSI 30, the DII 31 and the DDB 32 having the form of MPEG-2 TS data that are transmitted from the application server 110 are received periodically.

At step S52, the DSI 30, the DII 31 and the DDB 32 are decoded. Then, at step S53, DDB 32 with updated module version information is checked from the decoded DSI 30 and DII 31. At step S54, the objects of the updated modules are abstracted out of the checked DDB 32.

At step S55, the file system structures and contents of the application are updated by storing the updated objects abstracted in the above. At step S56, the updated objects that are stored and the objects already stored are executed and outputted onto a screen.

Figure 6:
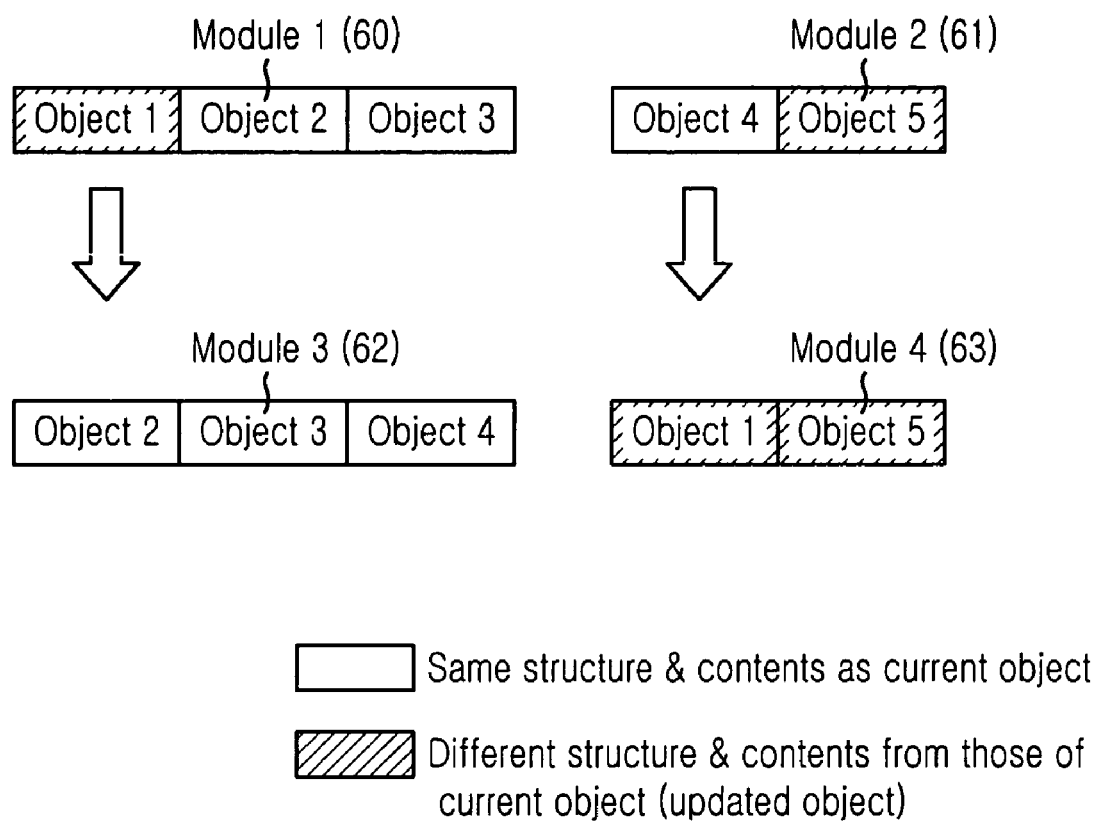
FIG. 6 is a diagram describing a module forming process in the headend when objects are updated in accordance with an embodiment of the present invention.

FIG. 6 is a diagram describing a module forming process in the headend when objects are updated in accordance with an embodiment of the present invention. As shown, a module 1 60 including an object 1 through object 3 and a module 2 61 including an object 4 and an object 5 are formed initially in the application server 110 and then transmitted to the host 200 in the form of DDB 32.

While the modules 60 and 61 are transmitted from the application server 110 to the host 200 periodically, if the object 1 of the module 1 60 and the object 5 of the module 2 61 are updated among the application and contents stored in the broadcasting data storing module 114, the application server 110 forms the objects 2 and 3 of the module 1 60 which are not updated and the object 4 of the module 2 61 which is also not updated.

The module identification and module information of the module 3 62 are established to be the same as those of the module 1 60. The application server 110 forms a module 4 63 including the updated object 1 of the module 1 60 and the updated object 5 of the module 2 61. It also establishes the module identification of the module 4 to be the same as that of the module 2 61 and establishes module version of the module 4 63 to be higher than that of the module 2 61.

Additionally, the sizes of the modules 1 to 4 60 to 63 are established no more than the maximum size of a module, which is 65.536 bytes. It is also possible to reduce transmission rate and time for executing decompression in the host 200 optionally.

As described above, the application server 110 forms updated object modules and non-updated object modules, respectively, adds them to the DDB 32 and transmits them to the host 200. Then, the host 200 abstracts only the updated DDB 32 having updated message header and module version selectively, and updates the data of the application.

In short, the DDB 32 of a modules having the same version as that a previously received module does not require additional abstraction and analysis processes, and only the DDB 32 of a module having a different version from the version of a previously received module is abstracted selectively and analyzed.

Since not all the received DDBs 32 are abstracted and analyzed, it takes less time to execute the application and contents in the host 200. In addition, the resources with limited quantity can be distributed properly and used for other operations.

The updated data processing method of the present invention can minimize delay time in the digital data broadcasting service in a subscriber's terminal and save wasteful use of limited resources, thus improving operation speed. When application data are updated, modules including updated objects and modules including non-updated objects are formed in an application server among the objects that constitute an application. The modules are transmitted to the subscriber's terminal. Then, the subscriber's terminal abstracts only the updated objects and updates the application data.

While the present invention has been described with respect to certain preferred embodiments, it will be apparent to those skilled in the art that various changes and modifications may be made without departing from the scope of the invention as defined in the following claims.

What is claimed is:

1. A method comprising:

processing updated data of an application in a headend of a digital data broadcasting system, said processing including:

confirming that the application data are updated upon one of an application content update request of a subscriber terminal and application file update of a contents provider;

generating signaling information of the updated application data and transmitting the signaling information;

separating updated objects from non-updated objects among objects constituting the application, and updating a file system structure and contents of the application;

forming a first module including the updated objects but not the non-updated objects;

forming a second module including the non-updated objects but not the updated objects;

updating version information of the first module but not the second module;

abstracting the updated objects from the first module and storing the abstracted updated objects;

generating:

download data block (DDB) including the formed first second modules;

download service initiate (DSI) for the formed first and second modules; and download information indication (DII) including control information for the updated objects and non-updated objects, wherein the control information in part includes updated version information obtained in the abstracting step;

encoding the DSI, DII and DDB in a form of Moving Picture Experts Group (MPEG)-2 transport stream (TS) data; and transmitting the encoded DSI, DII and DDB to the subscriber terminal sequentially and periodically.

2. A method comprising:

processing updated data of an application in a subscriber terminal of a digital data broadcasting system, said processing including:

receiving signaling information of the updated data of the application transmitted from a headend;

receiving data obtained from a first module and a second module and receiving control information for the data, the first module and the second module being transmitted from the headend, the first module including updated objects but not non-updated objects, the second module including the non-updated objects but not the updated objects;

receiving download service initiate (DSI), download information indication (DII) and download data block (DDB) encoded in a form of Moving Picture Experts Group (MPEG)-2 transport stream (TS) data from the headend sequentially and periodically, wherein the DDB to include the first module and the second module and the DSI and the DII to include control information of the first module and the second module;

decoding the received data and the control information for the data;

confirming that module version information of the data is updated from the decoded control information;

abstracting the updated objects of the first module;

updating the file system structure and contents of the application by storing the abstracted objects;

executing the updated objects that are stored and objects already stored in priority order based on received object signaling information; and outputting updated data to a screen.

* * * * *